(12) United States Patent
Kim et al.

(10) Patent No.: US 12,494,679 B2
(45) Date of Patent: Dec. 9, 2025

(54) HEARING DEVICE CHARGERS AND HEARING DEVICES FOR USE WITH SAME

(71) Applicant: Sonova AG, Stäfa (CH)

(72) Inventors: Jaewoo Kim, Waterloo (CA); Sahba Aazami, Founex (CH); Mika Ilvonen, Guelph (CA)

(73) Assignee: Sonova AG, Staefa (CH)

( * ) Notice: Subject to any disclaimer, the term of this patent is extended or adjusted under 35 U.S.C. 154(b) by 262 days.

(21) Appl. No.: 18/187,043

(22) Filed: Mar. 21, 2023

(65) Prior Publication Data

US 2024/0322615 A1    Sep. 26, 2024

(51) Int. Cl.
| H04R 25/00 | (2006.01) |
| H02J 7/00 | (2006.01) |
| H02J 50/00 | (2016.01) |
| H02J 50/10 | (2016.01) |
| H02J 50/90 | (2016.01) |

(52) U.S. Cl.
CPC ............ *H02J 50/90* (2016.02); *H02J 7/0044* (2013.01); *H02J 50/005* (2020.01); *H02J 50/10* (2016.02); *H04R 25/602* (2013.01); *H04R 25/604* (2013.01); *H04R 25/609* (2019.05); *H04R 2225/025* (2013.01); *H04R 2225/31* (2013.01); *H04R 2225/51* (2013.01)

(58) Field of Classification Search
CPC ................ H04R 25/602; H04R 25/604; H04R 2225/025; H04R 2225/31; H04R 2225/51; H04R 2420/07; H04R 1/1025; H04R 25/55; H04R 25/609; H02J 50/90; H02J 50/10; H02J 50/005; H02J 7/0044

USPC .......................................... 381/74, 323, 384
See application file for complete search history.

(56) References Cited

U.S. PATENT DOCUMENTS

| 8,169,185 | B2 | 5/2012 | Partovi et al. |
| 8,629,654 | B2 | 1/2014 | Partovi et al. |
| 9,967,644 | B2 | 5/2018 | Chawan et al. |
| 10,212,506 | B2 | 2/2019 | Panecki et al. |
| 11,595,767 | B1 | 2/2023 | Rufenacht et al. |
| 12,279,093 | B2 | 4/2025 | Kim et al. |
| 2007/0104343 | A1 | 5/2007 | Bengtsson |
| 2008/0118093 | A1 | 5/2008 | Klemenz et al. |
| 2008/0136369 | A1 | 6/2008 | Klemenz et al. |
| 2016/0020633 | A1* | 1/2016 | Han ................... H02J 50/12 320/108 |
| 2018/0332408 | A1 | 11/2018 | Frei et al. |
| 2019/0173301 | A1 | 6/2019 | Narayanasamy et al. |
| 2019/0348863 | A1 | 11/2019 | De Masi et al. |
| 2020/0260176 | A1 | 8/2020 | Baltensperger et al. |
| 2021/0168536 | A1 | 6/2021 | Nielsen et al. |
| 2021/0385591 | A1 | 12/2021 | Nielsen et al. |

(Continued)

FOREIGN PATENT DOCUMENTS

| CN | 110336342 | * 10/2019 |
| EP | 3518560 B1 | 11/2020 |

(Continued)

*Primary Examiner* — Norman Yu
(74) *Attorney, Agent, or Firm* — Henricks Slavin LLP

(57) ABSTRACT

A hearing device charger for use with a hearing device including a charger housing, a transmitter coil, a power supply operably connected to the transmitter coil, and a hearing device support, defining a central axis and associated with the charger housing and the transmitter coil, configured to rotate the transmitter coil relative to the charger housing.

21 Claims, 4 Drawing Sheets

(56) References Cited

U.S. PATENT DOCUMENTS

| | | |
|---|---|---|
| 2022/0225004 A1 | 7/2022 | Pedersen |
| 2023/0082030 A1* | 3/2023 | Michaelsen ........... H02J 50/005 |
| | | 320/109 |
| 2023/0223797 A1* | 7/2023 | He ..................... H05K 7/20127 |
| | | 320/108 |
| 2024/0322578 A1 | 9/2024 | Ilvonen et al. |
| 2024/0323622 A1 | 9/2024 | Kim et al. |

FOREIGN PATENT DOCUMENTS

| | | |
|---|---|---|
| WO | WO 2015105648 A1 | 7/2015 |
| WO | WO 2021220077 A1 | 11/2021 |
| WO | WO 2022225445 | * 10/2022 |

* cited by examiner

HEARING DEVICE CHARGERS AND HEARING DEVICES FOR USE WITH SAME

BACKGROUND

1. Field

The present disclosure relates generally to the charging of hearing devices.

2. Description of the Related Art

In-the-ear hearing devices, in-the-canal hearing devices and completely-in-the-canal hear devices (collectively referred to herein as "ITE hearing devices") may include a housing that has a main portion with a sound output port that is positioned facing to the tympanic membrane and a faceplate at the lateral end of the main portion. Hearing device components, such as a microphone, a receiver, electronics and a rechargeable battery (e.g., a rechargeable lithium-ion battery) may be located with the housing main portion and/or faceplate. Ambient sound pressure waves are picked up by the microphone and converted into electrical signals. The electrical signals, in turn, are processed by sound processor circuitry. The processed signals drive the receiver, which delivers amplified (or otherwise processed) sound pressure waves to the ear canal.

The ITE hearing device battery may in some instances be wirelessly charged with a battery charger. Here, the ITE hearing device includes a charging receiver coil and the battery charger includes a charging transmitter coil. The charging transmitter coil, which transfers power to the charging receiving coil, may be carried within a charging post on which the ITE hearing device is mounted during charging, and the charging post and ITE hearing device may be configured in such a manner that an optimal coil alignment is maintained. The charging post and ITE hearing device may also include magnets that secure the ITE hearing device to the charging post. Exemplary chargers are illustrated and described in US Pat. Pub. Nos. 8, 169, 185B2 and 8,629654B2 and US Pat. Pub. Nos. 2008/0118093A1, 2008/0136369A1, and 20190348863A1.

The present inventors have determined that the battery chargers associated with ITE hearing devices are susceptible to improvement. For example, the present inventors have determined that proper alignment of the battery charger and ITE hearing device increases the efficiency of the power transfer from battery chargers to ITE hearing devices and that conventional alignment methods are susceptible to improvement.

SUMMARY

A hearing device charger in accordance with at least one of the present inventions comprises a charger housing, a transmitter coil, a power supply operably connected to the transmitter coil, and a hearing device support, defining a central axis and associated with the charger housing and the transmitter coil, configured to rotate the transmitter coil relative to the charger housing. The present inventions also include systems including such a hearing device charger in combination with a hearing device.

A hearing device charger, for use with a hearing device that includes a receiver coil, comprises a charger housing, a transmitter coil, a power supply operably connected to the transmitter coil, and means for automatically rotating the transmitter coil relative to the charger housing and into alignment with the hearing device receiver coil when the hearing device is adjacent to the transmitter coil. The present inventions also include systems including such a hearing device charger in combination with a hearing device.

There are a variety of advantages associated with such chargers and systems. By way of example, but not limitation, the present chargers and systems may be used to automatically rotate the charger transmitter coil into alignment with the hearing device receiver coil when the hearing device is placed on the charger, thereby eliminating any inefficiencies associated with misalignment.

The above described and many other features of the present inventions will become apparent as the inventions become better understood by reference to the following detailed description when considered in conjunction with the accompanying drawings.

BRIEF DESCRIPTION OF THE DRAWINGS

Detailed descriptions of the exemplary embodiments will be made with reference to the accompanying drawings.

DETAILED DESCRIPTION OF THE EXEMPLARY EMBODIMENTS

Figure 1:
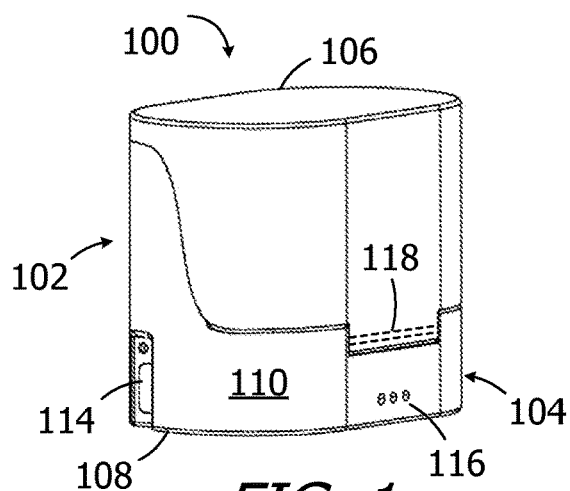
FIG. 1 is a perspective view of a hearing device charger in accordance with one embodiment of a present invention.
Figure 2:
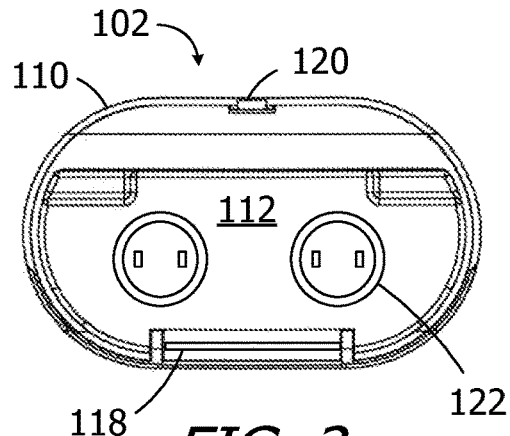
FIG. 2 is a top view of a portion of the hearing device charger illustrated in FIG. 1.

The following is a detailed description of the best presently known modes of carrying out the inventions. This description is not to be taken in a limiting sense, but is made merely for the purpose of illustrating the general principles of the inventions. The present inventions also have application in a wide variety of hearing devices that provide sound (i.e., either sound or a perception of sound) to the hearing impaired as well as others who require such hearing devices on a situational basis. Examples of such hearing devices include hearing aids, such as the ITE hearing aids described herein. The present inventions are not, however, limited to ITE hearing aids, and may be employed in combination with other hearing devices that currently exist, or are yet to be developed.

It should also be noted that if and when used herein, the term "lateral" refers to the direction and parts of hearing devices which during use face away from the tympanic membrane, the term "medial" refers to the direction and parts of hearing devices which during use face toward the tympanic membrane, the term "superior" refers to the direction and parts of hearing devices which during use face the top of the head, the term "inferior" refers to the direction and parts of hearing devices which during use face the feet, the term "anterior" refers to the direction and parts of hearing devices which during use face the front of the body, and the "posterior" refers to the direction and parts of hearing devices which during use face the rear of the body.

Referring to FIGS. 1-6, the exemplary hearing device charger (or "charger") 100 includes a base 102, with a housing 104 in which various components are located and on which various components are supported, and a cover 106 that may be pivotably mounted to the base 102. The exemplary housing 104 has a bottom wall 108, a perimeter wall 110, and an interior wall 112. A power port 114 extends through the perimeter wall 110 and a visible indicator 116, such as the illustrated set of LEDs, is associated with the perimeter wall. The cover 106, which is shown in a closed state in FIG. 1 and is omitted from FIGS. 2 and 3, may be pivotably secured to the base 102 with a hinge pin 118 and may be maintained in a closed state with a latch 120 on the housing perimeter wall 110 and an indentation (not shown) on the cover 106. Suitable materials for the base 102 and cover 106 include, but are not limited to, polycarbonate/acrylonitrile butadiene styrene (PC/ABS) such as Sabic CYCOLY C1200HF or ABS such as Chimei POLYLAC PA757F.

Figure 9:
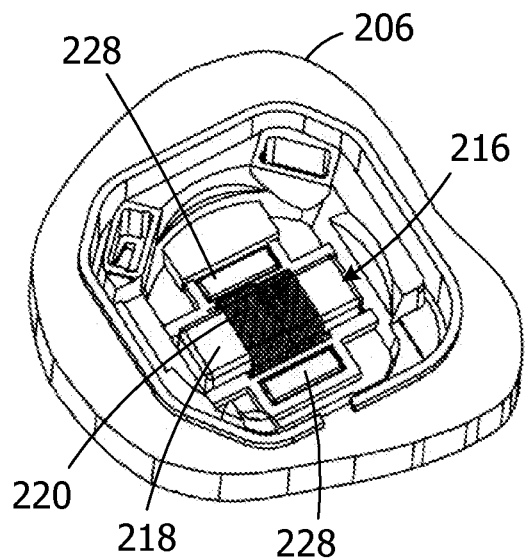
FIG. 9 is a perspective view of a portion of the hearing device illustrated in FIG. 8.

The exemplary charger 100 may also include one or more support posts, on which hearing devices are mounted during recharging, that each carry a transmitter coil assembly and are configured to align the transmitter coil assembly with the receiver antenna assembly of the hearing device. To that end, the exemplary charger 100 includes a pair of hearing device support posts 122 which may be mounted on, or may extend through, the interior wall 112. Each support post 122 includes a fixed outer member 124, and inner member 126 that is rotatable relative to the outer member about central axis A, a transmitter antenna assembly 128 that is mounted within the inner member and is used in conjunction with a receiver antenna assembly 216 (FIGS. 9 and 10), and magnets 130 that are attracted to hearing device magnets 228 (FIGS. 9 and 10), which together secure the hearing device 200 to the charging post 122 and that align the transmitter antenna assembly with the receiver antenna assembly in the manner described below with reference to FIGS. 16-19.

Figure 3:
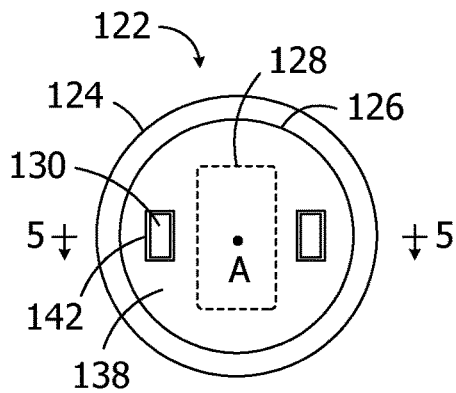
FIG. 3 is a top view of a portion of the hearing device charger illustrated in FIG. 1.
Figure 4:
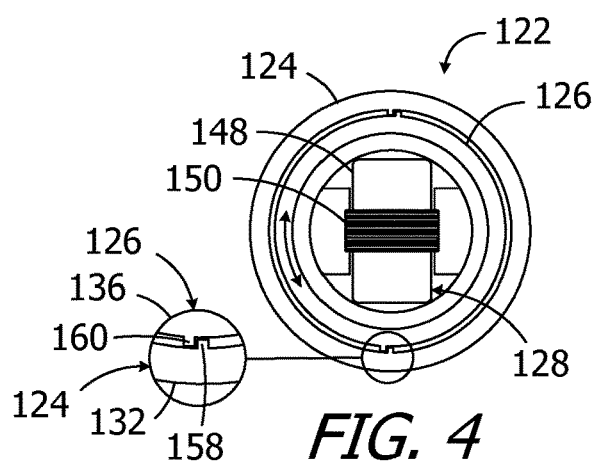
FIG. 4 is a bottom view of a portion of the hearing device charger illustrated in FIG. 1.
Figure 5:
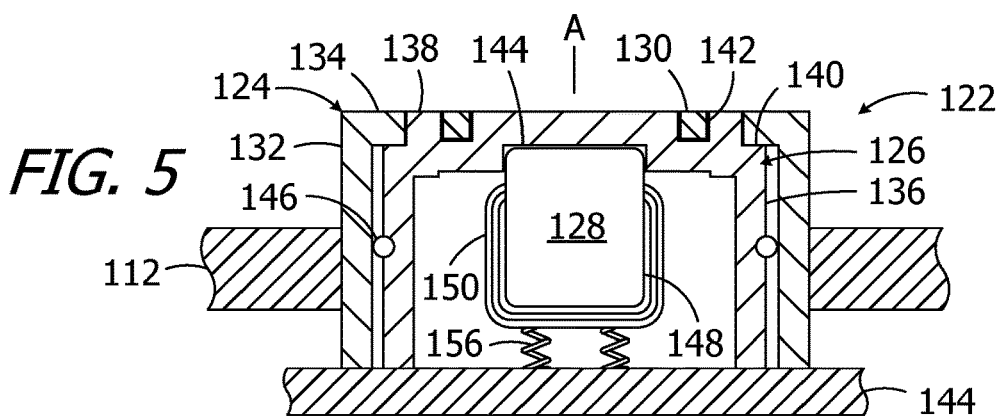
FIG. 5 is a section view taken along line 5-5 in FIG. 3.

Referring more specifically to FIGS. 3-5, the outer member 124 of the exemplary support post 122 includes a cylindrical wall 132 and an inwardly extending flange 134, while the inner member 126 includes a cylindrical wall 136 and a top wall 138 with an annular recess 140 for the outer member flange. The flange 134 and top wall 138 together define the top surface of the support post 122. The inner member top wall 138 includes magnet receptacles 142 for the magnets 130 and a slot 144 for the transmitter core 148 (discussed below with reference to FIG. 6) of the transmitter antenna assembly 128. The magnets 130 are diametrically opposed to one another, i.e., are offset from one another by about 180° C. enter to center (i.e., 180°+5%), and may have the top surfaces thereof exposed. The transmitter core 148 may be secured to the inner member top wall 138 with adhesive or other suitable instrumentalities. The outer member 124 may be secured to the charger housing interior wall 112 and/or to a printed circuit board ("PCB") 144 or other structure that is located within the charger housing base 104, thereby preventing rotation of the outer member. The inner member 126 rests on, but is not secured to, the PCB 144 in the illustrated embodiment and rotation of the inner member relative to the outer member 124 may be facilitated through the use of bearings 146 or other suitable instrumentalities.

Figure 6:
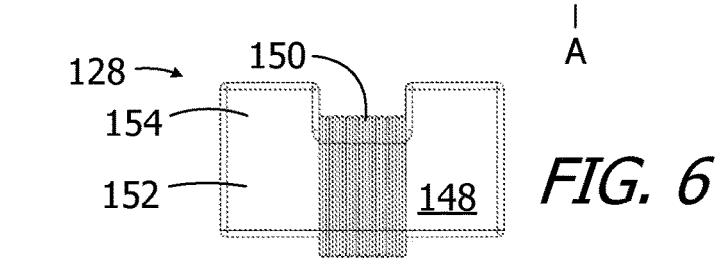
FIG. 6 is a side view of a portion of the hearing device charger illustrated in FIG. 1.

As is illustrated for example in FIGS. 4-6, the transmitter antenna assembly 128 located within each support post 122 includes a transmitter assembly core (or "transmitter core") 148 and a transmitter assembly coil (or "transmitter coil") 150 wound around the transmitter core, and is used in conjunction with a receiver antenna assembly 216 (FIGS. 9 and 10), with a receiver core 218 and a receiver coil 220, to efficiently transmit power to a hearing device 200 through inductive coupling in the manner described below with reference to FIGS. 12-15. The exemplary transmitter core 148 is substantially U-shaped in that it includes a main portion 152 and a pair of extensions 154 that extend from the main portion toward the inner member top wall 138 and, correspondingly, toward the intended location of the receiver antenna assembly 216 when the hearing device 200 is on the charging post 122. The main portion 152 of the substantially U-shaped core 148 may be straight with the extensions 152 perpendicular to the main portion 150 (as shown) or may be curved. As is discussed in greater detail below with reference to FIGS. 12-15, the transmitter core 148 is formed from a ferromagnetic material with relatively high magnetic permeability and provides a low reluctance magnetic route through which flux is channeled during charging operations. As used herein, magnetic material having a "relatively high magnetic permeability" is magnetic material having an initial magnetic permeability (pi) of at least 400. Suitable materials for the transmitter core 148 include, but are not limited to, ferromagnetic materials with relatively high magnetic permeability such as, for example, ferrites that include iron oxide in combination with one or more of nickel, zinc, manganese, magnesium and cobalt as well as nickel-iron alloys that are commonly referred to as mu-metal.

The transmitter coil 150 is electrically connected to the PCB 144 in a manner that accommodates the rotation of the support post inner member 126 and transmitter antenna assembly 128. The support post 122 may also be configured in such a manner that rotation of the inner member 126 relative to outer member 124 is limited to a predetermined range. Referring first to FIG. 5, the coil 150 is formed from a wire with ends 156 that are connected to the PCB 144, either directly or by way of a two-pin connector. The wire ends 156 may be helical, looped or otherwise dimensioned or shaped such that there is additional wire length between the PCB 144 and the coil 150 that can accommodate rotation of the transmitter antenna assembly 128 relative to the PCB. Turning to FIG. 4, the range of the inner member rotational motion is limited to about 180° in the illustrated implementation which, given the fact that the two magnets 130 are offset from one another by 180°, results in 360° of possible magnet locations. The range of rotational motion may be limited in any suitable manner. By way of example, but not limitation, the outer member 124 includes a pair of stop tabs 158 that are offset from one another by about 180° and the inner member 126 includes a pair of stop tabs 160 that are offset from one another by about 180°. The stop tabs 160 each engage a respective one the stop tabs 158 when the inner member 126 is in the rotational orientation illustrated in FIG. 4, and engage the opposite stop tab 158 when the inner member 126 is offset from the illustrated orientation by 180°. After engaging one another, the stop tabs 158 and 160 prevent further rotation in the direction that the inner member 126 was rotating and permit rotation in the opposite direction.

It should be noted that, in other implementations, the inner member 126 may be free to rotate 360° and beyond. For example, the ends of the transmitter coil 150 may be electrically connected to the PCB 144 by a swivel connector. Also, in some implementation, the outer member 124 may be omitted. Here, a single rotatable member (similar to the inner member 126) may be rotatably mounted to the housing or a structure therein (e.g., by a spindle within the housing or by a bearing associated with an aperture in the interior wall 112).

Figure 7:
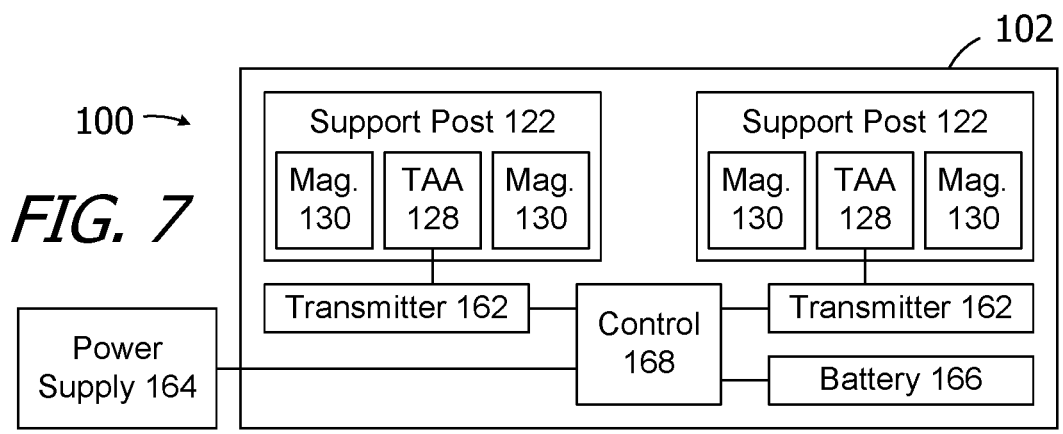
FIG. 7 is a functional block diagram of the hearing device charger illustrated in FIG. 1.
Figure 8:
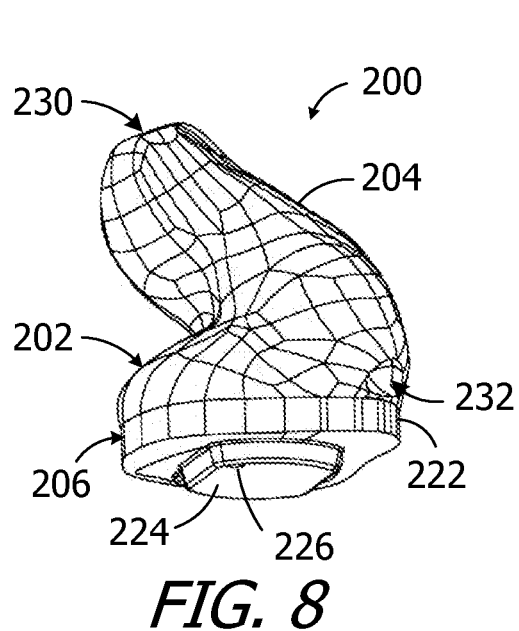
FIG. 8 is a perspective view of a hearing device in accordance with one embodiment of a present invention.

Turning to FIG. 7, transmitter circuits (or "charge circuits") 162 drive the antenna coils 150. Power may be provided by a power supply 164 (e.g., an external USB power supply) that may be connected to the power port 114 as well as by a rechargeable battery (or other energy storage and supply device) 166. Operation of the charger is controlled by control circuitry 168.

As illustrated for example in FIGS. 8-11, the exemplary ITE hearing device 200 includes a housing 202, with a shell 204 that defines a shape corresponding to the ear canal and a faceplate 206 mounted to the lateral end of the shell, as well as components such as a microphone 208, a receiver 210, a rechargeable battery or other rechargeable power source 212, and sound processing electronics 214 within the housing 202. A receiver antenna assembly 216, with a receiver assembly core (or "receiver core") 218 and a receiver assembly coil (or "receiver coil") 220 wrapped around the receiver core, receives power from one of the transmitter antenna assemblies 128 (FIGS. 3-6) through inductive coupling during charging by the charger 100, as is described below with reference to FIGS. 12-15. The exemplary faceplate 206 includes a main portion 222 and a projection 224, with a sound input aperture 226, that extends laterally from the main portion. The receiver antenna assembly 216 is located within the faceplate 206, as are magnets 228 that are attracted to the charger magnets 130 (FIGS. 3 and 5). For example, the magnets 130 and 228 define respective N-poles and S-pole and the magnets may be oriented in such a manner that the N-poles of the magnets 130 and face the S-poles of the magnets 228. The housing shell 204 is sized and shaped for positioning within the ear canal and includes a sound output aperture 230 and a venting aperture 232. The shape of the housing shell 204 may be a generic shape that is suitable for a large number of patients or may be a custom shape that is 3D printed or otherwise formed for the ear canal of a particular patient. Suitable housing materials include, but are not limited to, plastics such as an acrylic and metals such as titanium.

Figure 10:
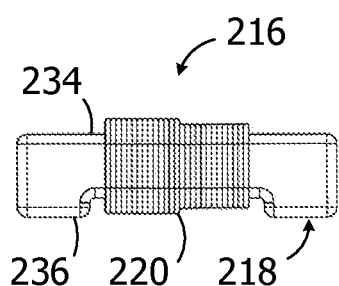
FIG. 10 is a side view of a portion of the hearing device illustrated in FIG. 8.
Figure 11:
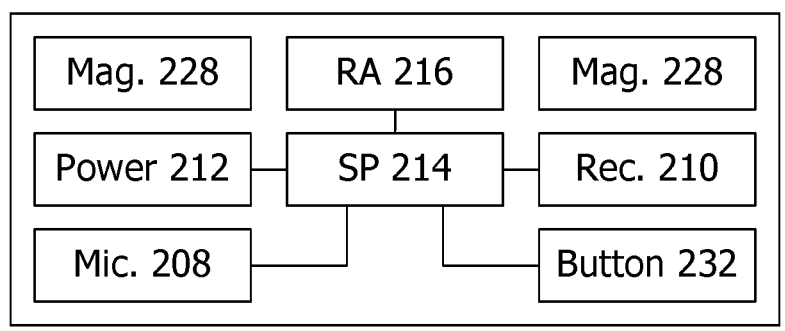
FIG. 11 is a functional block diagram of the hearing device illustrated in FIG. 8.
Figure 12:
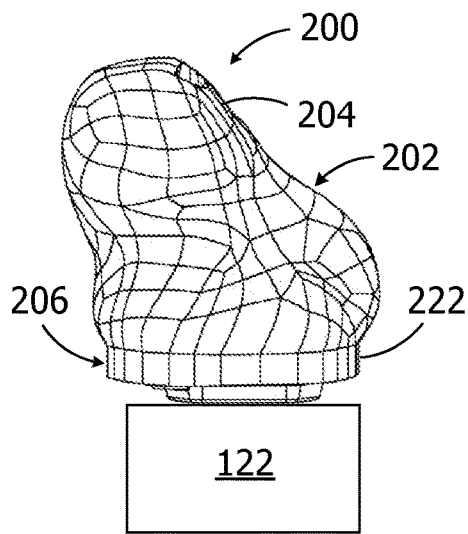
FIG. 12 is a side view of a hearing system including the hearing device illustrated in FIG. 8 and a portion of the hearing device charger illustrated in FIG. 1 in an engaged state with the hearing device in a charging position.

As illustrated for example in FIG. 10, the exemplary receiver core 218 is substantially U-shaped in that it includes a main portion 234 and a pair of extensions 236 that extend from the main portion toward the bottom wall of the projection 224 and, correspondingly, toward the intended location of the transmitter antenna assembly 128 when the hearing device 200 is in the engaged state on the charging post 122. The main portion 234 of the substantially U-shaped core 218 may be straight with the extensions 236 perpendicular to the main portion 234 (as shown) or may be curved. The extensions 236 may be omitted in some implementations. As is discussed in greater detail below with reference to FIGS. 12-15, the receiver core 218 is formed from a ferromagnetic material with relatively high magnetic permeability and provides a low reluctance magnetic route through which flux is channeled during charging operations. Suitable materials for the transmitter core 218 include, but are not limited to, ferromagnetic materials with relatively high magnetic permeability such as, for example, ferrites that include iron oxide in combination with one or more of nickel, zinc, manganese, magnesium and cobalt as well as nickel-iron alloys that are commonly referred to as mu-metal.

Figure 13:
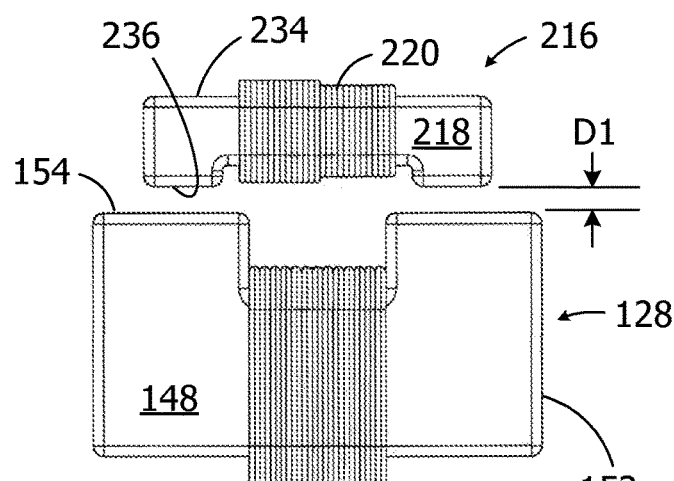
FIG. 13 is a side view of portions of the hearing device illustrated in FIG. 8 and the hearing device charger illustrated in FIG. 1 when the hearing device and charger are in the engaged state illustrated in FIG. 12.
Figure 14:
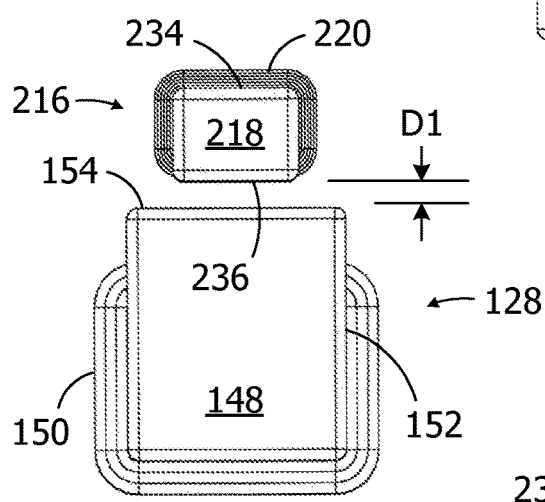
FIG. 14 is an end view of portions of the hearing device illustrated in FIG. 8 and the hearing device charger illustrated in FIG. 1 when the hearing device and charger are in the engaged state illustrated in FIG. 12.
Figure 15:
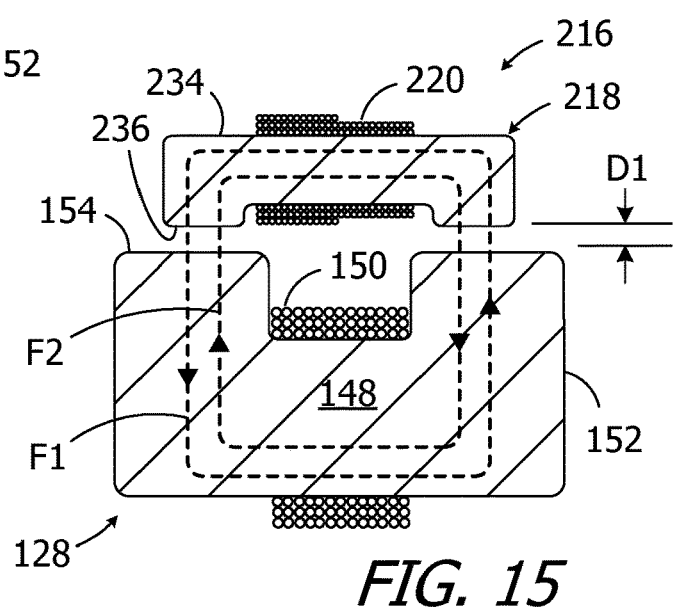
FIG. 15 is a section view of portions of the hearing device illustrated in FIG. 8 and the hearing device charger illustrated in FIG. 1 when the hearing device and charger are in the engaged state illustrated in FIG. 12 and the hearing device is being charged.

An exemplary hearing system may include the exemplary hearing device charger 100 and one or more hearing device 200. To that end, the exemplary hearing device 200 is shown in a charging position (or "engaged state") on one of the charger support posts 122 in FIG. 12. The hearing device projection 226 is located on the support post inner member 126 (FIGS. 3-5) and the hearing device and support post magnets 130 and 228 hold the hearing device 200 in place and maintain proper alignment of the transmitter and receiver assemblies 136 and 216. In particular, one of the transmitter antenna assemblies 128 of the charger 100 is aligned with the receiver antenna assembly 216 of the hearing device 200, and the alignment may be accomplished automatically in the manner described below with reference to FIGS. 16-19. In the illustrated implementation, the receiver core 218 is centered relative to the transmitter core 148, i.e., the receiver core and the transmitter core are aligned in the superior-inferior and anterior-posterior directions (FIGS. 13 and 14). The transmitter core 128 is separated from the receiver core 218 by a relatively small distance D1, as is shown in FIGS. 13 and 14. The distance D1 may range from about 0.1 mm to about 0.8 mm in some embodiments, and is about 0.45 mm in the illustrated embodiment. As used herein in the context of distance D1, "about" means±10%.

The respective configurations of the exemplary cores 148 and 218, as well as the distance D1 therebetween, results in the cores functioning together as a single ring-type core that provides a controlled closed loop path for magnetic flux in a manner similar to a transformer core. During charging, alternating current flows through the transmitter coil 150 as alternating voltage is applied to the transmitter coil. An alternating charging magnetic field (note flux lines F1 and F2) is created in the cores 148 and 218, thereby inductively coupling the receiver coil 220 to the transmitter coil 150. An alternating voltage is thereby applied to the receiver coil 220 and alternating current, which is used to charge the rechargeable power source 212, flows through the receiver coil.

There are a number of advantages associate with the use of the high magnetically permeable ferromagnetic cores 148 and 218 in the manner described above. For example, by providing the aforementioned magnetic flux path, the cores 148 and 218 increase the efficiency of the power transfer from the transmitter coil 150 to the receiver coil 220, as compared to hearing systems where the charger and hearing device lack such cores. The increased efficiency facilitates the use of smaller coils. The magnetic flux path also prevents demagnetizing of positioning magnets that are close to the coils, such as the magnets 130 and 228, because the magnetic flux path reduces their exposure to the strong magnetic fields associated with charging.

Figure 16:
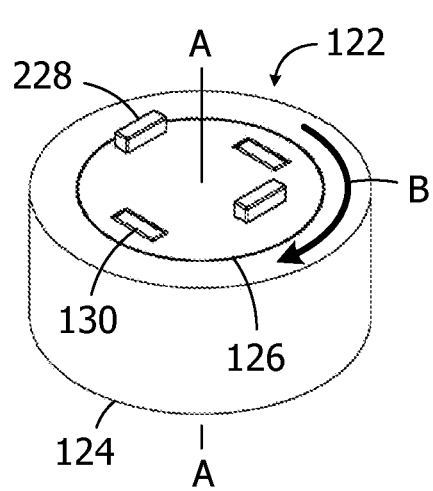
FIG. 16 is a perspective view of portions of the hearing device illustrated in FIG. 8 and the hearing device charger illustrated in FIG. 1 with the magnets thereof misaligned.
Figure 17:
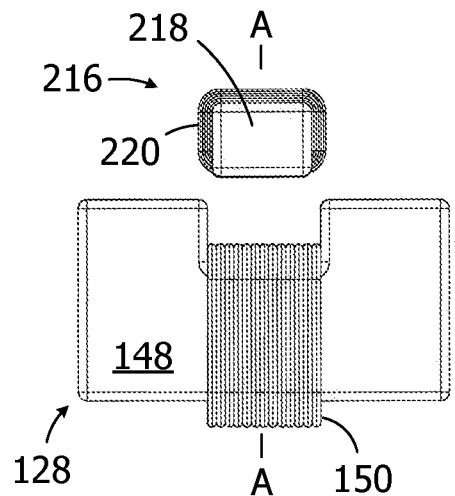
FIG. 17 is a side view of portions of the hearing device illustrated in FIG. 8 and the hearing device charger illustrated in FIG. 1 with the transmitter and receiver coil assemblies thereof misaligned.
Figure 18:
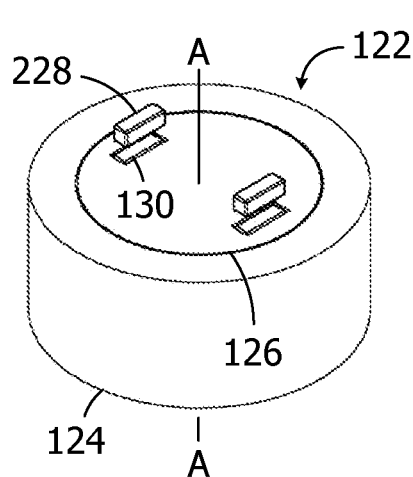
FIG. 18 is a perspective view of portions of the hearing device illustrated in FIG. 8 and the hearing device charger illustrated in FIG. 1 with the magnets thereof aligned.
Figure 19:
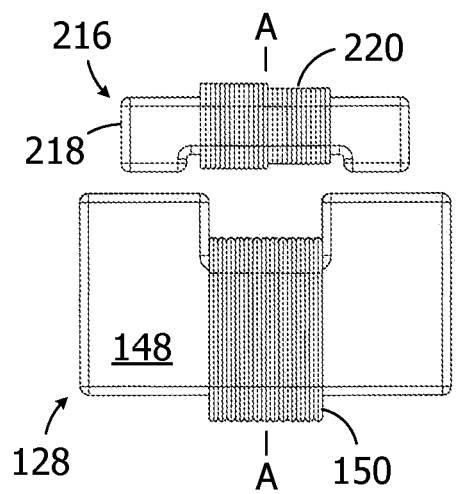
FIG. 19 is a side view of portions of the hearing device illustrated in FIG. 8 and the hearing device charger illustrated in FIG. 1 with the transmitter and receiver coil assemblies thereof aligned.

As noted above, transmitter antenna assembly 128 of the charger 100 should be aligned with the receiver antenna assembly 216 of the hearing device 200 during charging. The respective configurations of the charger 100 and hearing device 200 are such that the transmitter antenna assembly 128 will automatically align with the receiver antenna assembly 216 when the hearing device is placed onto the charging post 122, i.e., the transmitter antenna assembly will rotate into alignment with the receiver antenna assembly without any alignment activity by the user and regardless of the initial orientation of the transmitter antenna assembly relative to the receiver antenna assembly. To that end, FIGS. 16 and 17 show the relative locations of certain components of the hearing device 200 and charger 100 as the hearing device is being placed onto the charging post 122 in an orientation that results in the transmitter antenna assembly 128 and the receiver antenna assembly 216 being misaligned. The magnetic attraction force between charging post magnets 130 and the hearing device magnets 228 causes the post inner member 126 to rotate about central axis A relative to the fixed outer member 124, in the direction indicated by arrow B, from the orientation illustrated in FIG. 16 to the orientation illustrated in FIG. 18 where the post magnets 130 are aligned with the hearing device magnets 228. Put another way, the post inner member 126 and magnets 130 perform the function of automatically rotating the transmitter antenna assembly 128 into alignment with the receiver antenna assembly 216 as the hearing device 200 is placed onto the charging post 122. The transmitter antenna assembly 128 rotates with the post inner member 126 about axis A from the orientation illustrated in FIG. 17 to the orientation illustrated in FIG. 19 (and FIGS. 13-15) where the transmitter antenna assembly 128 is aligned with the receiver antenna assembly 216. Power transmission from the charger 100 to the hearing device 200 may then proceed in the manner described above by way of the transmitter and receiver antenna assemblies 128 and 216.

Although the inventions disclosed herein have been described in terms of the preferred embodiments above, numerous modifications and/or additions to the above-described preferred embodiments would be readily apparent to one skilled in the art. By way of example, but not limitation, the inventions include any combination of the elements from the various species and embodiments disclosed in the specification that are not already described. It is intended that the scope of the present inventions extend to all such modifications and/or additions and that the scope of the present inventions is limited solely by the claims set forth below.

We claim:

1. A hearing device charger for use with a hearing device including a hearing device magnet, the hearing device charger comprising:
    a charger housing;
    a transmitter coil;
    a power supply operably connected to the transmitter coil; and
    a hearing device support associated with the charger housing, defining a central axis, and including a rotational portion in which the transmitter coil is located, and at least one support magnet, located in spaced relation to the transmitter coil, that is configured to rotate the rotatable portion and the transmitter coil about the central axis relative to the charger housing in response to magnetic attraction force between the support magnet and the hearing device magnet.

2. A hearing device charger as claimed in claim 1, wherein the at least one support magnet comprises first and second support magnets.

3. A hearing device charger as claimed in claim 2, wherein the first and second support magnets are offset from one another by about 180° around the central axis.

4. A hearing device charger as claimed in claim 1, wherein the hearing device support comprises a hearing device support post that includes a fixed outer member and a rotatable inner member that is rotatable about the central axis relative to the fixed outer member; and
    the transmitter coil is within the rotatable inner member.

5. A hearing device charger for use with a hearing device, the hearing device charger comprising:
    a charger housing;
    a transmitter coil;
    a power supply operably connected to the transmitter coil; and
    a hearing device support defining a central axis and associated with the charger housing and the transmitter coil and including a hearing device support post that includes a fixed outer member, a rotatable inner member that is rotatable about the central axis relative to the fixed outer member and in which the transmitter coil is located, and at least one magnet on the rotatable inner member.

6. A hearing device charger as claimed in claim 5, wherein the at least one magnet on the rotatable inner member comprises first and second magnets on the rotatable inner member.

7. A hearing device charger as claimed in claim 6, wherein the first and second magnets are offset from one another by about 180° around the central axis.

8. A hearing device charger as claimed in claim 1, wherein the transmitter coil is part of a transmitter antenna assembly that also includes a transmitter core having a relatively high magnetic permeability around which the transmitter coil is wound.

9. A hearing device charger as claimed in claim 8, wherein the transmitter core is substantially U-shaped.

10. A hearing device charger as claimed in claim 4, wherein
    the rotation of the rotatable inner member is limited to a predetermined rotational range of less than 360°.

11. A hearing device charger as claimed in claim 10, wherein
    the predetermined rotational range is about 180°.

12. A hearing device charger as claimed in claim 10, wherein the fixed outer member and the rotatable inner member include respective stop tabs that engage one another to limit rotation to the predetermined range.

13. A hearing device charger as claimed in claim 4, wherein
the fixed outer member is fixed to the housing or to a structure within the housing.

14. A hearing device charger for use with a hearing device that includes a receiver coil, the hearing device charger comprising:
a charger housing;
a transmitter coil;
a power supply operably connected to the transmitter coil; and
means for automatically rotating the transmitter coil relative to the charger housing and into alignment with the hearing device receiver coil through the use of magnetic attraction force, between a portion of the hearing device and the means for automatically rotating, that causes the rotation when the hearing device is adjacent to the transmitter coil.

15. A hearing device charger as claimed in claim 14, wherein
the receiver coil is part of a receiver antenna assembly that also includes a receiver core having a relatively high magnetic permeability around which the receiver coil is wound;
the transmitter coil is part of a transmitter antenna assembly that also includes a transmitter core having a relatively high magnetic permeability around which the transmitter coil is wound; and
the means for automatically rotating the transmitter coil rotates the transmitter core into alignment with the receiver core.

16. A hearing device charger as claimed in claim 15, wherein
the transmitter core is substantially U-shaped.

17. A hearing system, comprising:
a hearing device including
a microphone,
a receiver operably connected to the microphone,
a rechargeable power source,
at least one hearing device magnet, and
a receiver antenna operably connected to the rechargeable power source; and
a hearing device charger as claimed in claim 1.

18. A hearing system as claimed in claim 17, wherein
the receiver coil is part of a receiver antenna assembly that also includes a receiver core having a relatively high magnetic permeability around which the receiver coil is wound.

19. A hearing system as claimed in claim 17, wherein
the at least one hearing device magnet comprises first and second hearing device magnets.

20. A hearing system as claimed in claim 17, wherein
the hearing device comprises an ITE hearing device.

21. A hearing device charger for use with a hearing device, the hearing device charger comprising:
a charger housing;
a transmitter coil;
a power supply operably connected to the transmitter coil;
a hearing device support that is associated with the charger housing and the transmitter coil, that defines an axis of rotation which passes through the transmitter coil and the hearing device support, and that is configured to rotate the transmitter coil about the axis of rotation relative to the charger housing; and
at least one magnet on the hearing device support.

\* \* \* \* \*